(12) United States Patent
Brainard et al.

(10) Patent No.: US 7,954,766 B2
(45) Date of Patent: Jun. 7, 2011

(54) SYSTEM AND METHOD FOR IMPROVED ROTARY-WING AIRCRAFT PERFORMANCE WITH INTERIOR/EXTERNAL LOADS

(75) Inventors: Steven J. Brainard, Cheshire, CT (US); David R. Houy, Shelton, CT (US); Anthony Z. Stobiecki, Huntington, CT (US); Mark W. Scott, Bethany, CT (US); Steven D. Weiner, Orange, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1188 days.

(21) Appl. No.: 11/455,482

(22) Filed: Jun. 19, 2006

(65) Prior Publication Data

US 2010/0222993 A1    Sep. 2, 2010

Related U.S. Application Data

(60) Provisional application No. 60/693,593, filed on Jun. 24, 2005.

(51) Int. Cl.
*B64D 47/00*     (2006.01)
(52) U.S. Cl. .................. 244/194; 701/124; 73/65.05
(58) Field of Classification Search .................. 244/194, 244/76 R, 195; 701/124; 73/65.05, 178 T
See application file for complete search history.

(56) References Cited

U.S. PATENT DOCUMENTS

| | | | | |
|---|---|---|---|---|
| 2,873,075 A * | 2/1959 | Mooers et al. | ............. | 244/17.13 |
| 2,890,826 A * | 6/1959 | Cushman | ..................... | 235/61 T |
| 3,510,107 A * | 5/1970 | Fidler | ........................... | 254/275 |
| 3,601,342 A * | 8/1971 | Piasecki | ..................... | 244/137.4 |
| 3,701,279 A * | 10/1972 | Harris et al. | ................. | 73/65.06 |
| 3,756,543 A * | 9/1973 | Fowler et al. | ................ | 244/177 |
| 3,833,189 A * | 9/1974 | Fowler et al. | ................ | 244/177 |
| 3,838,836 A | 10/1974 | Asseo et al. | | |
| 3,904,156 A * | 9/1975 | Smith | ........................ | 244/118.1 |
| 3,946,971 A * | 3/1976 | Chadwick | .................. | 244/137.4 |
| 3,976,265 A * | 8/1976 | Doolittle | .......................... | 244/2 |
| 4,110,605 A * | 8/1978 | Miller | ........................... | 701/124 |
| 4,463,428 A | 7/1984 | Gilliam | | |
| 4,545,019 A * | 10/1985 | Glover | ......................... | 701/124 |
| 4,622,639 A * | 11/1986 | Adelson et al. | .............. | 701/124 |
| 4,780,838 A | 10/1988 | Adelson | | |
| 4,935,885 A * | 6/1990 | McHale et al. | .............. | 702/175 |
| 4,937,754 A * | 6/1990 | Buisson et al. | .............. | 701/124 |
| 4,949,269 A * | 8/1990 | Buisson et al. | .............. | 701/124 |
| 4,993,665 A | 2/1991 | Sparling | | |
| 5,034,896 A | 7/1991 | Orgun | | |

(Continued)

OTHER PUBLICATIONS

PCT International Search Report and Written Opinion, mailed May 5, 2008.

(Continued)

*Primary Examiner* — Benjamin P Lee
(74) *Attorney, Agent, or Firm* — Carlson Gaskey & Olds P.C.

(57) ABSTRACT

An interactive aircraft load management system automates calculation and provides simulation capability to changes in an aircraft C.G. limit for display on a three-dimensional aircraft symbology. The aircraft load management system also communicates with a fly by wire (FBW) flight control system wherein the aircraft's control system is programmed to automatically compensate for C.G. excursions and to alter control laws. The aircraft load management system also selectively reels-in and reels out sling lines as the aircraft pitches and rolls to maintain a load vector from a slung load along the aircraft centerline. Load vector travel is accomplished by coupling a winch control system into the flight control system.

22 Claims, 13 Drawing Sheets

U.S. PATENT DOCUMENTS

| | | | | |
|---|---|---|---|---|
| 5,465,925 A * | 11/1995 | Connolly et al. | ......... | 244/137.1 |
| 5,499,785 A | 3/1996 | Roberts et al. | | |
| 5,521,827 A * | 5/1996 | Lindberg et al. | ............. | 701/124 |
| 5,571,953 A * | 11/1996 | Wu | ............. | 73/65.06 |
| 5,788,186 A | 8/1998 | White | | |
| 5,987,397 A * | 11/1999 | McCool et al. | ............. | 702/173 |
| 6,032,090 A * | 2/2000 | von Bose | ........................ | 701/37 |
| 6,275,769 B1 | 8/2001 | Willis | | |
| 6,533,220 B2 * | 3/2003 | Schuster | .................... | 244/118.1 |
| 6,564,142 B2 * | 5/2003 | Godwin et al. | ............. | 701/124 |
| 6,650,974 B2 * | 11/2003 | Chamas et al. | .................. | 701/5 |
| 6,913,228 B2 * | 7/2005 | Lee et al. | .................. | 244/135 C |
| 7,198,227 B2 * | 4/2007 | Olin et al. | .................. | 244/118.1 |
| 2002/0099497 A1 * | 7/2002 | Godwin et al. | ............. | 701/124 |
| 2002/0171008 A1 * | 11/2002 | Schuster | .................... | 244/118.1 |
| 2004/0153219 A1 * | 8/2004 | Shimel | ............... | 701/3 |
| 2004/0226996 A1 | 11/2004 | Stefani | | |
| 2005/0051666 A1 | 3/2005 | Lee et al. | | |
| 2005/0067529 A1 * | 3/2005 | Takadama et al. | ......... | 244/118.1 |
| 2006/0283239 A1 * | 12/2006 | Leroy et al. | .................. | 73/65.05 |
| 2007/0200032 A1 * | 8/2007 | Eadie et al. | ................ | 244/137.4 |
| 2007/0255489 A1 * | 11/2007 | Jensen et al. | ................... | 701/124 |
| 2008/0046168 A1 * | 2/2008 | McCarthy et al. | ............ | 701/124 |
| 2008/0203232 A9 * | 8/2008 | Enzinger et al. | ............. | 244/195 |
| 2008/0255713 A1 * | 10/2008 | Onu et al. | ......................... | 701/3 |

OTHER PUBLICATIONS

European Search Report dated Aug. 13, 2009.

"Active Aerodynamic Stabilization of a Helicopter/Sling-Load System," Reuben Rax, Aviv Rosen, and Tuvia Ronen, Journal of Aircraft, AIAA, Reston, VA, US, vol. 26, No. 9, Sep. 1, 1989, pp. 822-828.

"Near-Hover Control of a Helicopter with a Hanging Load," N.K. Gupta and Artheur E. Bryson, Jr., Journal of Aircraft, vol. 13, No. 3, 1976, pp. 217-222.

* cited by examiner

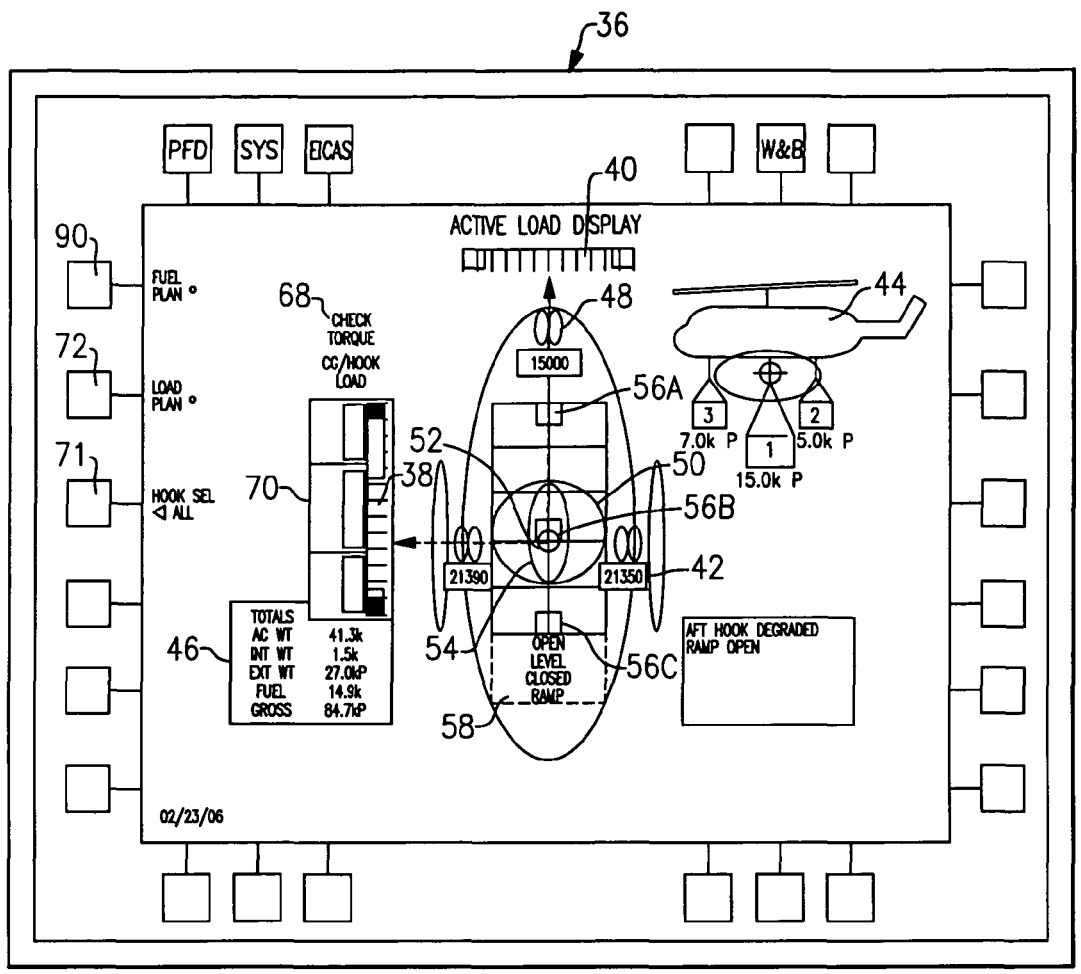
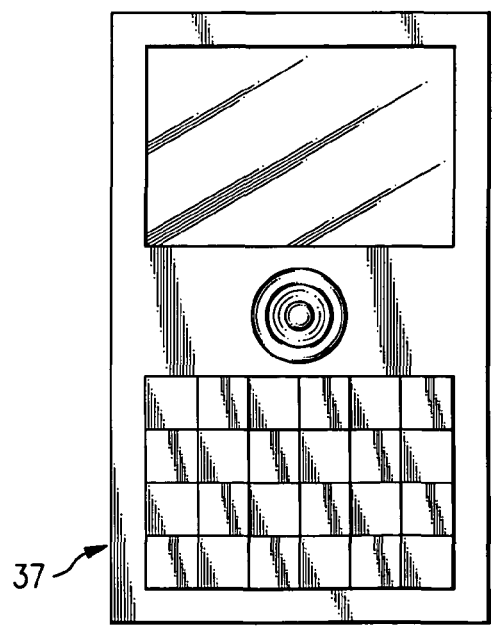
FIG.3

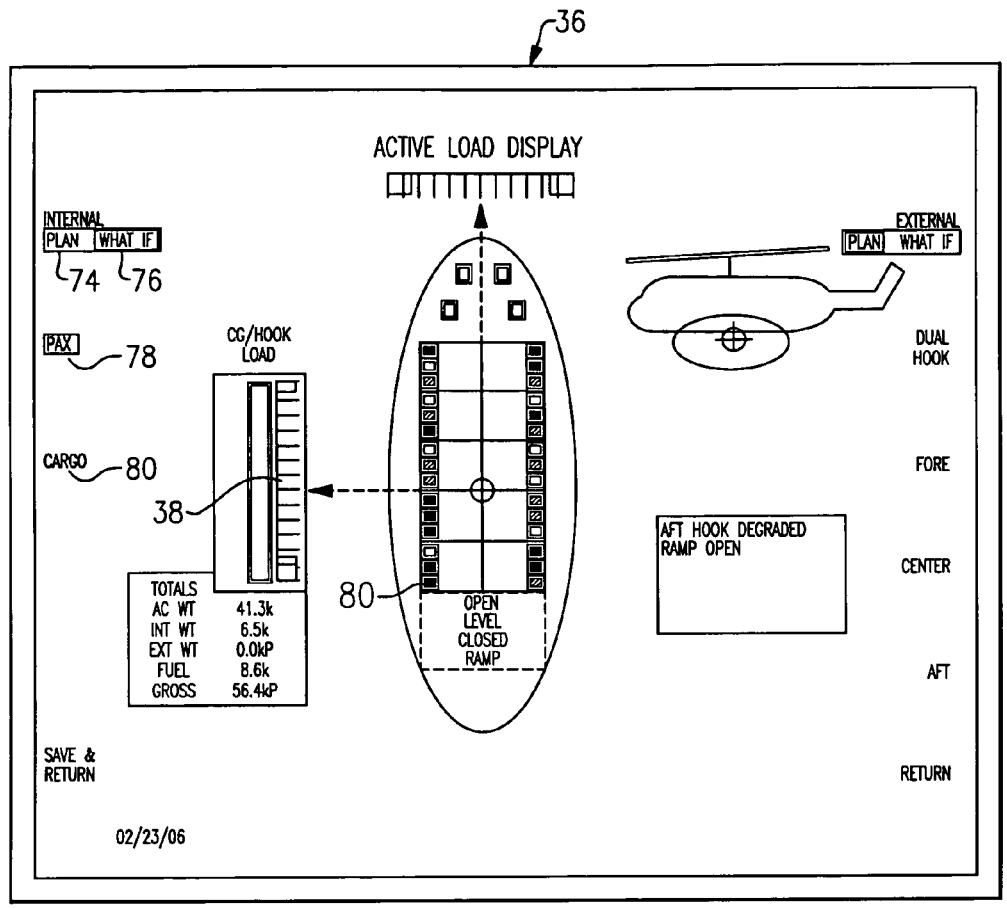
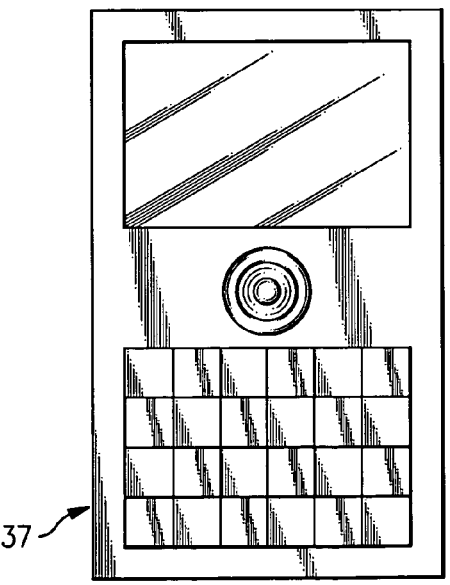
FIG.4

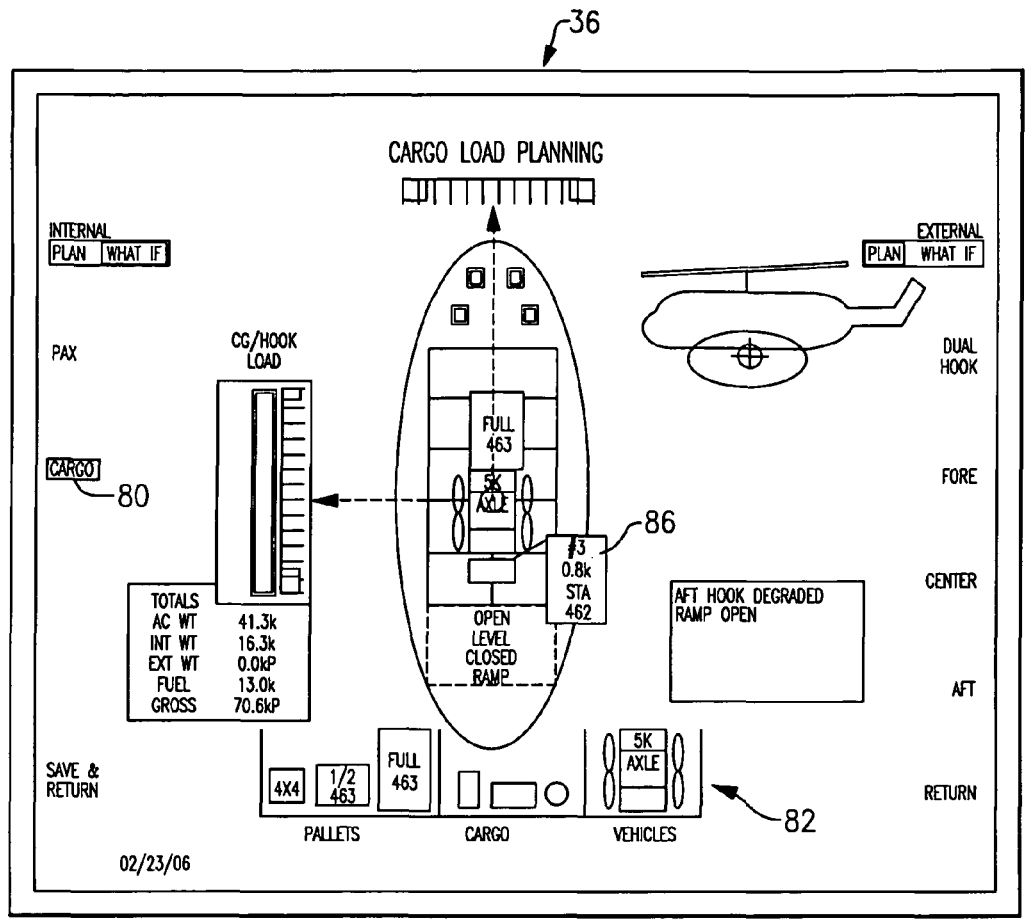
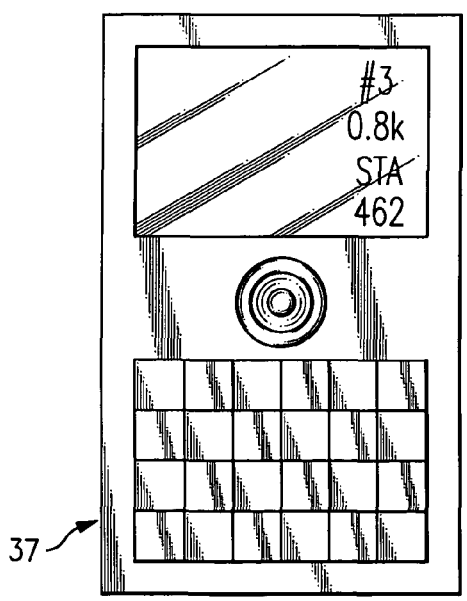
FIG.5

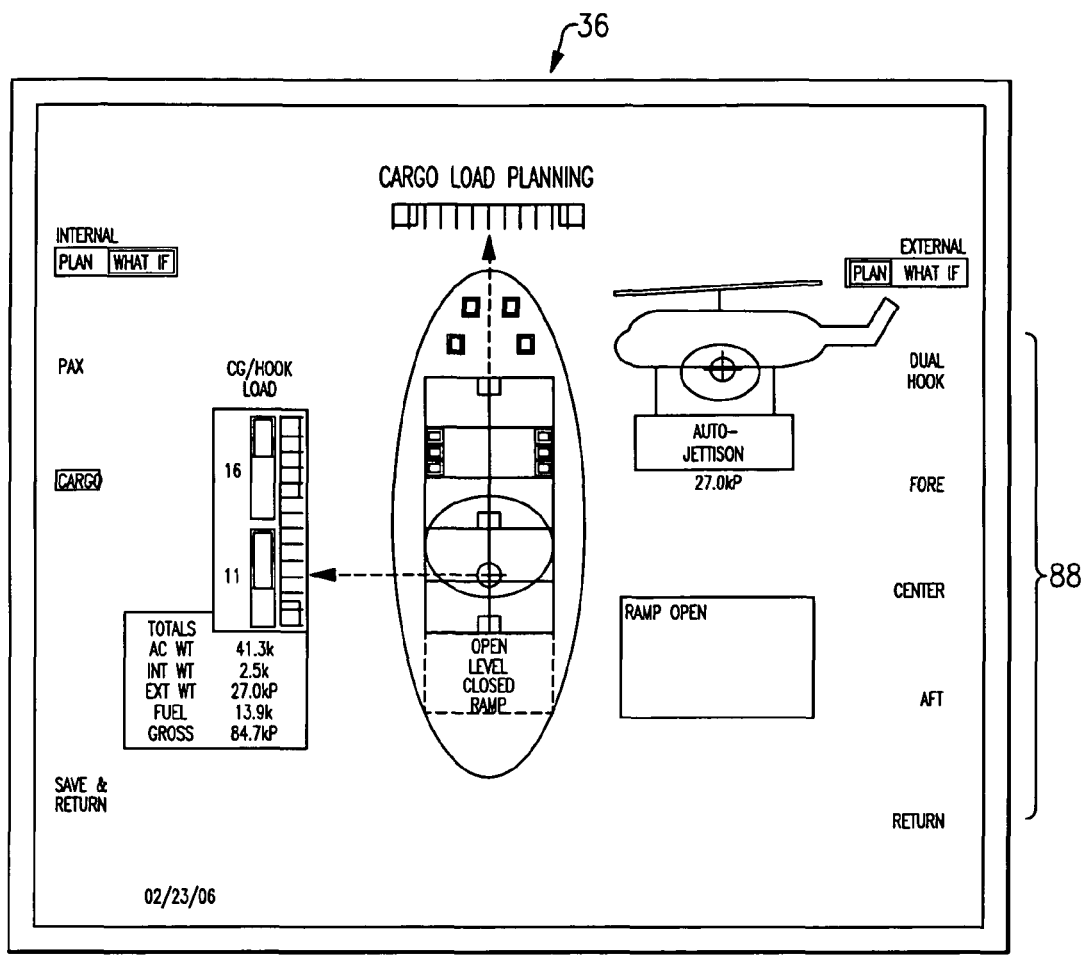
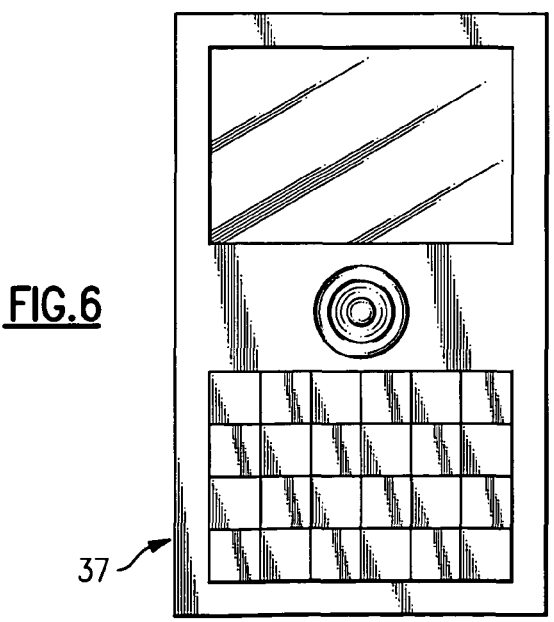
FIG.6

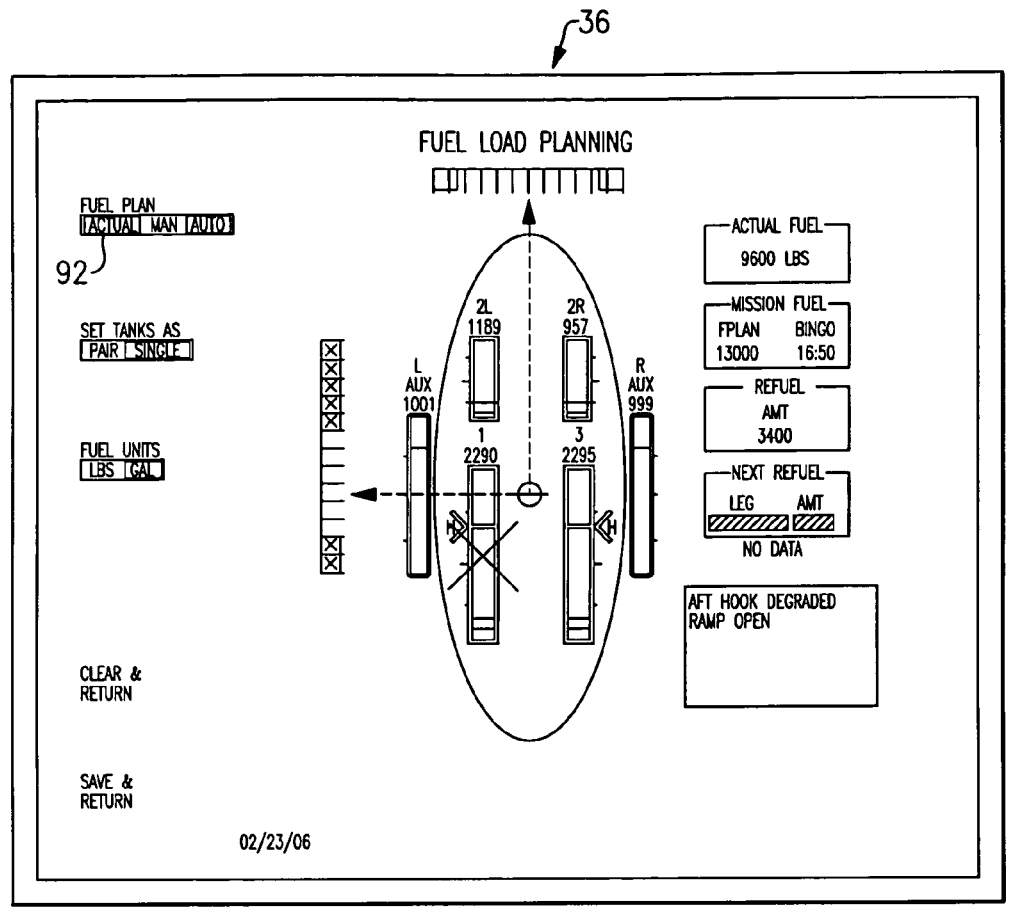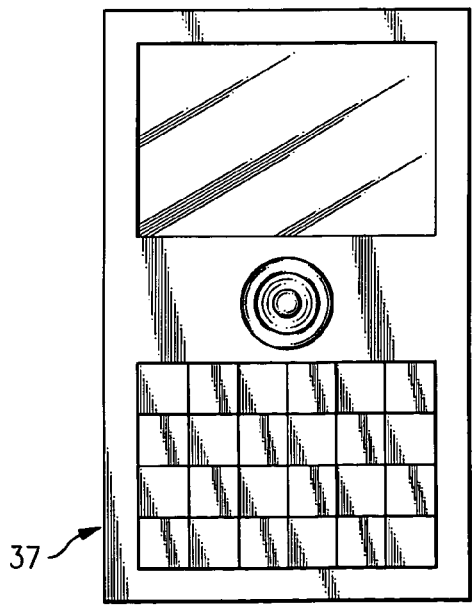
FIG.7

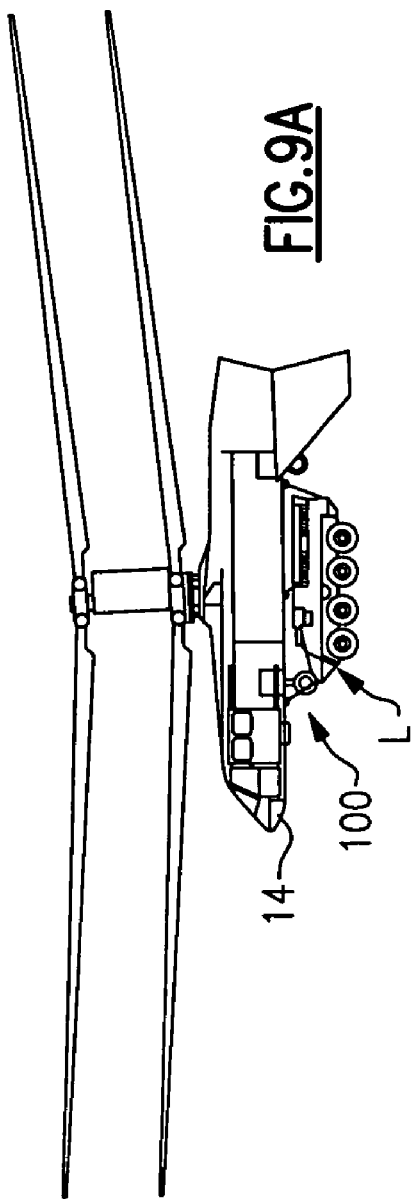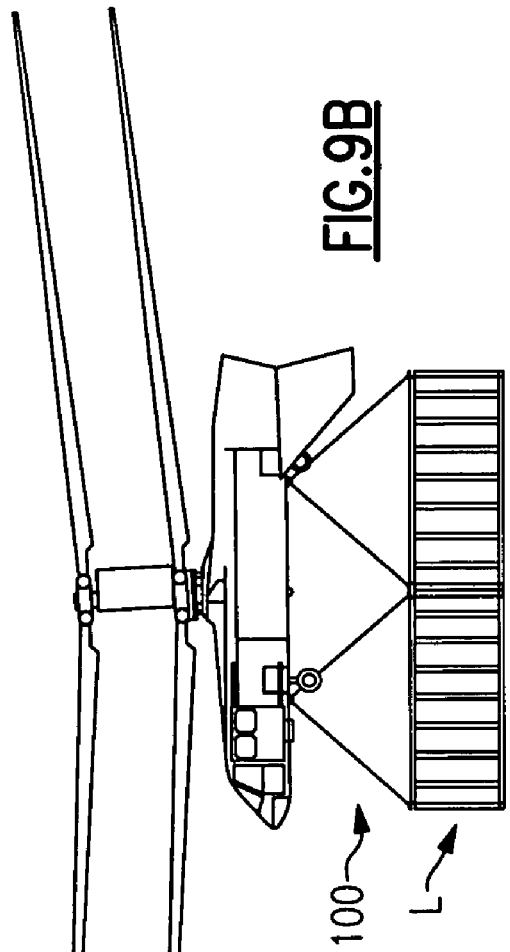

US 7,954,766 B2

SYSTEM AND METHOD FOR IMPROVED ROTARY-WING AIRCRAFT PERFORMANCE WITH INTERIOR/EXTERNAL LOADS

BACKGROUND OF THE INVENTION

The present invention claims the benefit of U.S. Provisional Patent Application No. 60/693,593, filed Jun. 24, 2005.

This invention was made with government support under U.S. Navy Contract No. N00019-03-G-0003. The government therefore has certain rights in this invention.

The present invention relates to a rotary-wing aircraft load management system, and more particularly to a system and method that calculates an aircraft's C.G. location and/or C.G. acceptable limits so that an aircrew can predict, simulate, and verify loads and C.G. information in real time.

Vertical takeoff and landing (VTOL) rotary-wing aircraft are unique in their ability to carry loads externally. Future military forces require enhanced vertical lift capabilities in a compact package. Super heavy lift (SHL) rotary-wing aircraft are generally defined as an aircraft with twice the largest payload of current helicopters. Future requirements are envisioned to be in the range of over 80,000 pounds of payload over a 400 mile range while being shipboard compatible.

To ensure effective flight operations, the location of an aircraft's center of gravity (C.G.) should be within specified limits as an aircraft's C.G. varies in response to the weights and locations of fuel and payload. Calculating an aircraft's C.G. may be a tedious manual process such that the time required to verify weights and locations, for example in a combat environment, is often unavailable.

SUMMARY OF THE INVENTION

A method of managing an aircraft load according to an exemplary aspect of the present invention includes determining an aircraft C.G. with an aircraft load in real time with an aircraft load management system; communicating aircraft C.G. data between the aircraft load management system and a flight control system; and trimming the flight control system in response thereto.

A method of managing an aircraft load according to an exemplary aspect of the present invention includes determining an aircraft C.G. in real time with an aircraft load management system and displaying symbology representing the aircraft C.G.

A system to managing aircraft loads according to an exemplary aspect of the present invention includes a sensor system that receives weight information, an aircraft load management system in communication with the sensor system, and a display in communication with the aircraft load management system, the display displaying an aircraft C.G. relative an aircraft PLAN VIEW to display the aircraft C.G. in real time.

A system to managing aircraft loads according to an exemplary aspect of the present invention includes an aircraft load management system that determines aircraft C.G. data of an aircraft with an aircraft load in real time, and a flight control system in communication with said aircraft load management system, the flight control system programmed to adjust an aircraft trim state in response to the aircraft C.G. data.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a representation of an ACTIVE LOAD DISPLAY page of the load management system;

FIG. 4 is an internal cargo load planning page displayed by the Load Management System 34;

FIG. 5 is an internal cargo load planning page displayed by the Load Management System 34 including a cargo selection table;

FIG. 6 is an external cargo load planning page displayed by the load management system;

FIG. 7 is an external fuel load planning page displayed by the load management system;

FIG. 9A is a side view of an external slung load carrier close to an underside of the aircraft;

FIG. 9B is a schematic side view of the aircraft of FIG. 9A illustrating a slung load a distance from the underside of the aircraft in a more conventional manner as also illustrated in FIG. 1B;

DETAILED DESCRIPTION OF THE DISCLOSED EMBODIMENT

Figure 1A:
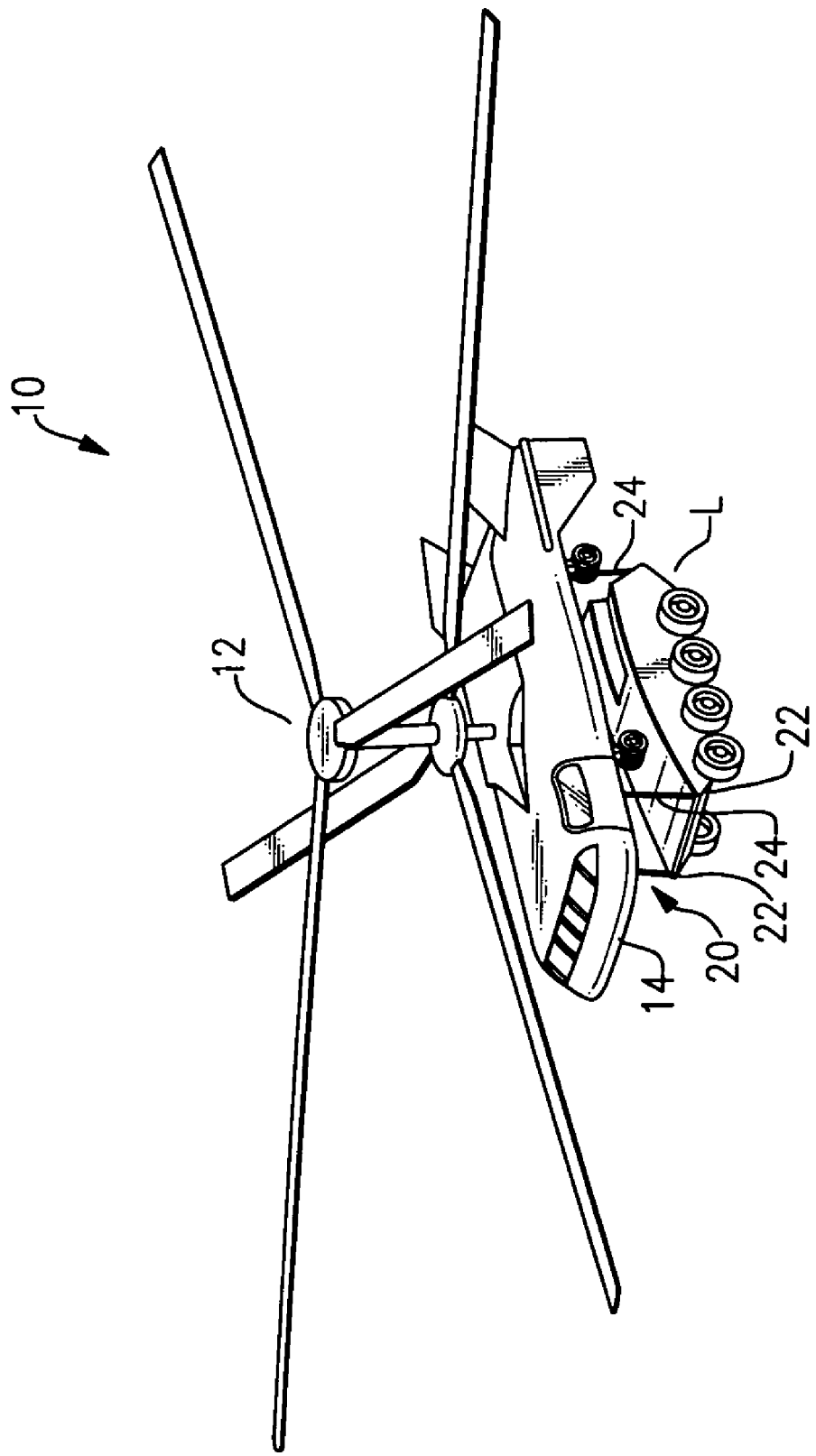
FIG. 1A is a general perspective view of an exemplary rotary-wing aircraft embodiment with an external load for use with the present invention utilizing a 4 point sling system to retain a slung load close to the aircraft underside.
Figure 1B:
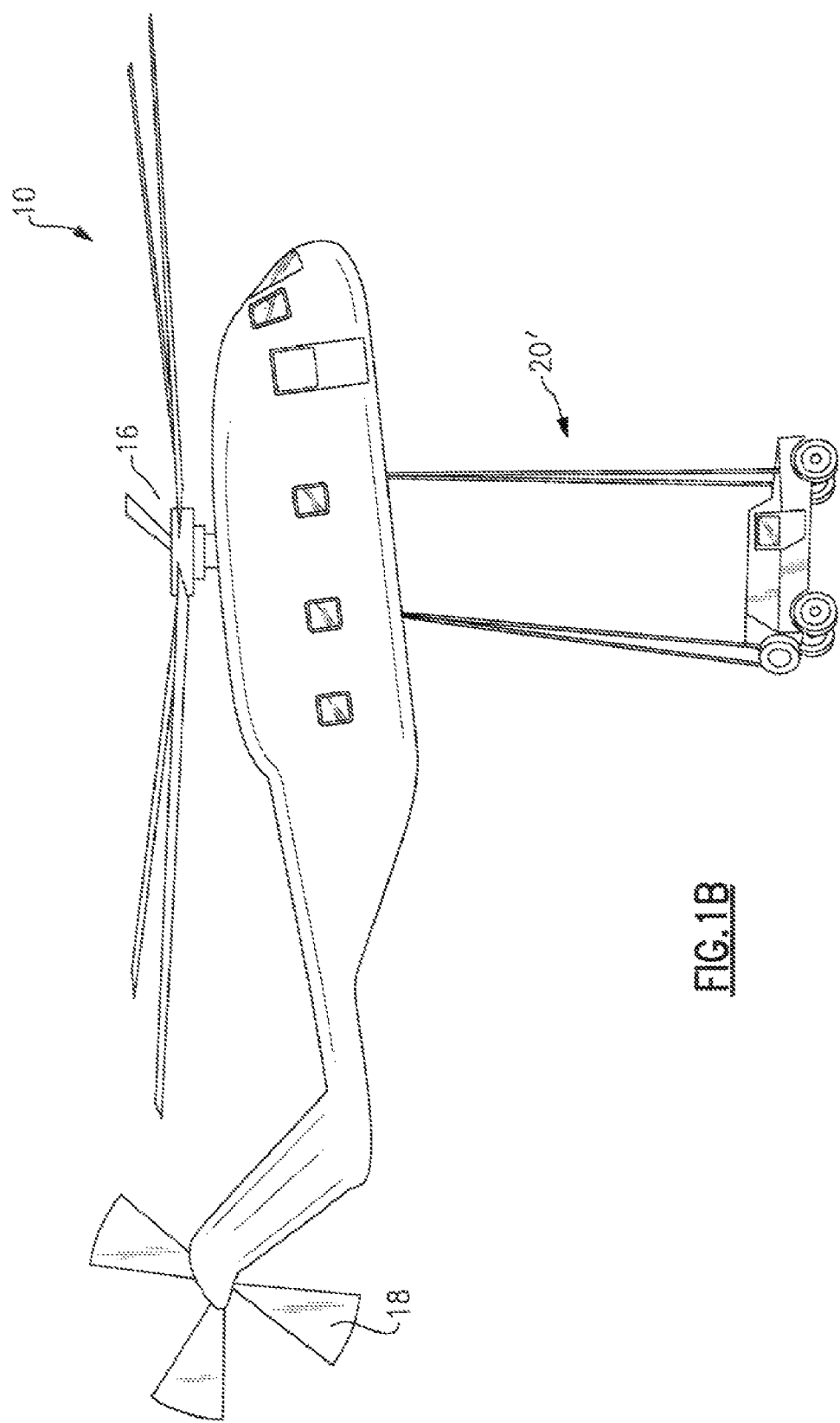
FIG. 1B is a general perspective view of another exemplary rotary-wing aircraft embodiment with an external load for use with the present invention utilizing a conventional slung load system.

FIG. 1A schematically illustrates a rotary-wing aircraft 10 having a dual, counter-rotating, coaxial rotor system 12 mounted to a fuselage 14. The dual, counter-rotating, coaxial rotor system 12 includes an upper rotor system and a lower rotor system upon an essentially tailless fuselage which facilitates shipboard compatibility. Although a particular type rotary-wing aircraft configuration is illustrated in the disclosed embodiment, other aircraft such as conventional cargo aircraft, helicopters 10' having a single main rotor assembly 16 and an anti-torque rotor 18 (FIG. 1B), flying cranes, tilt-rotor and tilt-wing aircraft will also benefit from the present invention.

An external load L is slung from the airframe 14 through a sling system 20 having a multitude of hoists 22 which deploy a cable 24 to the external load or loads L for attachment thereof. The cables 24 may be connected to the external load L or loads in any conventional manner.

Figure 2:
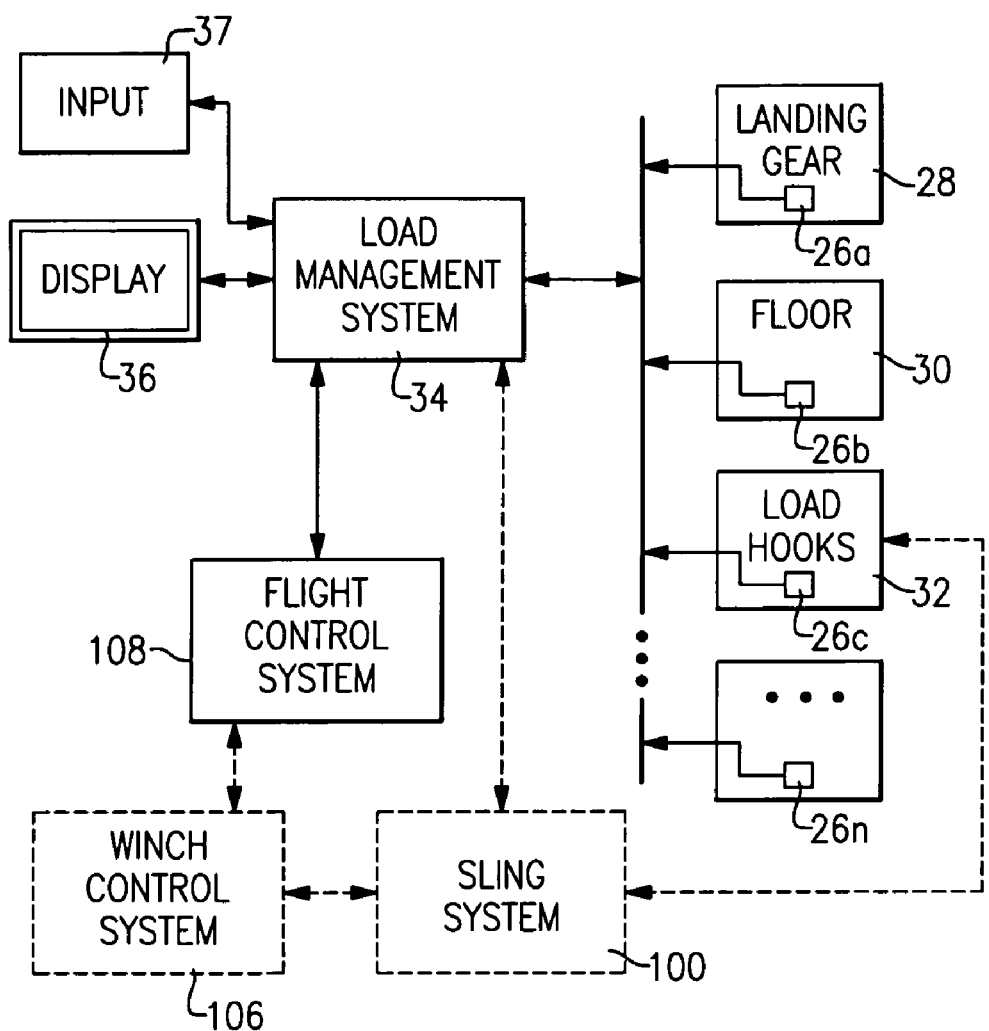
FIG. 2 is a schematic block diagram of a load management system.
Figures 3A, 3B, 3C:
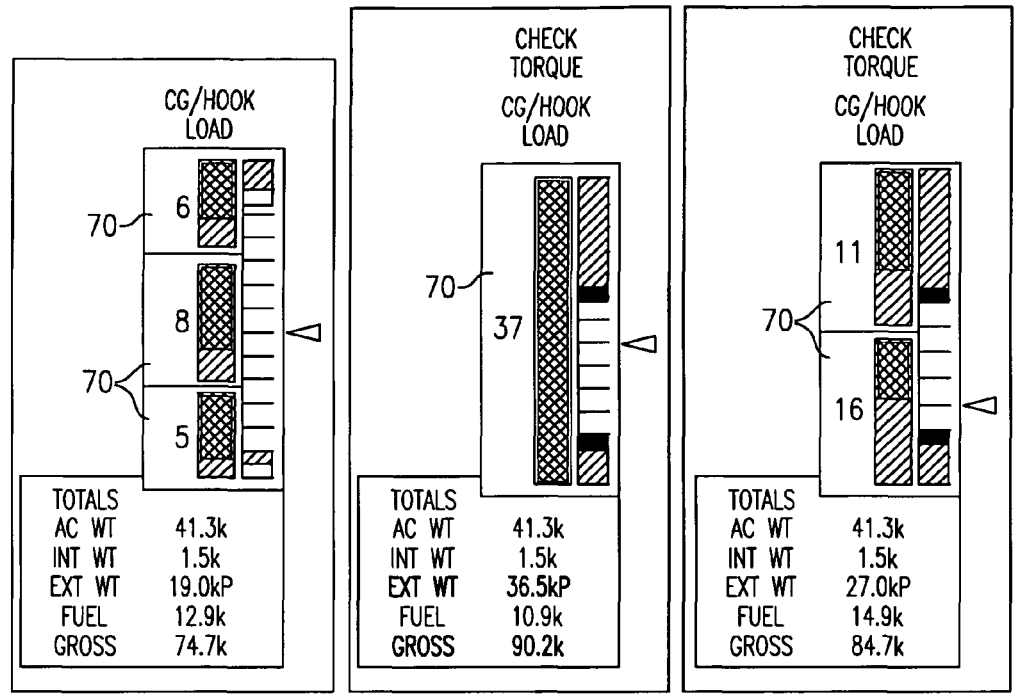
FIG. 3A is an expanded view of a Hook Status Indicators illustrating three individual loads on three external hooks.
FIG. 3B is an expanded view of a Hook Status Indicators illustrating one external load on a single external hook; the external load exceeding the hook limit.
FIG. 3C is an expanded view of a Hook Status Indicators illustrating two individual loads on two external hooks.
Figures 3D, 3E:
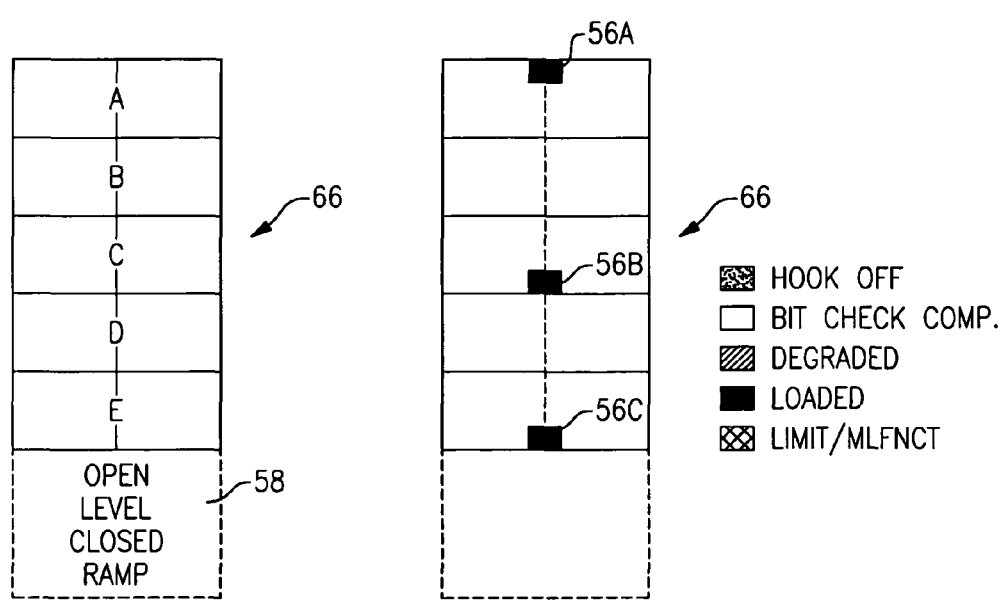
FIG. 3D is an expanded view of a cabin floor plan symbology shown in FIG. 3.
FIG. 3E is an expanded view of a Hook Status Indicators overlaid upon the cabin floor plan symbology of FIG. 3D.
Figure 3G:
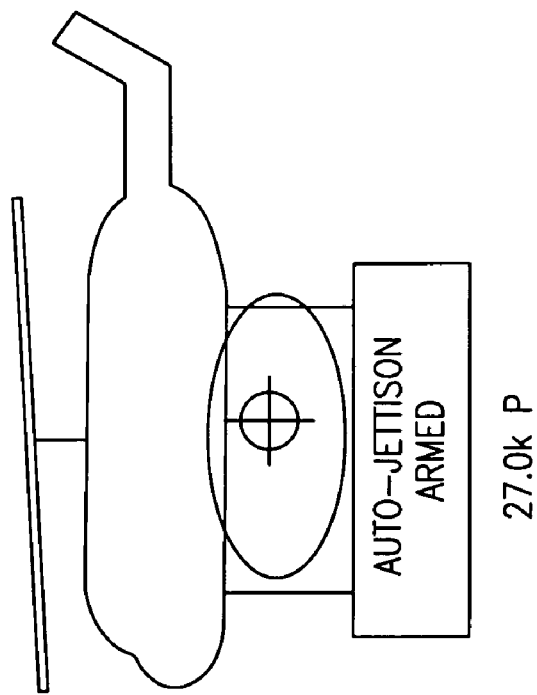
FIG. 3G is an expanded view of an aircraft profile view from FIG. 3 illustrating a multitude of dual hook loads, their jettison sequence and a three-dimensional actual C.G. location within a C.G. limit ring.
Figure 3F:
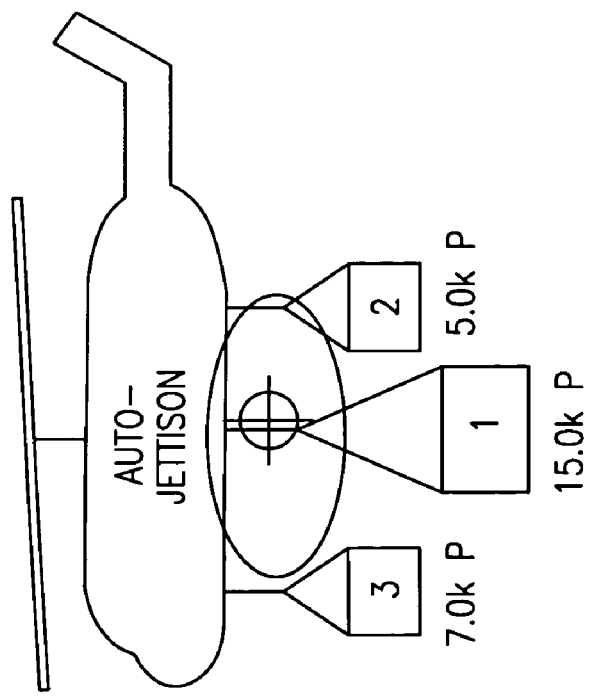
FIG. 3F is an expanded view of an aircraft profile view from FIG. 3 illustrating a multitude of slung loads, their jettison sequence and a three-dimensional actual C.G. location within a C.G. limit ring.
Figure 8D:
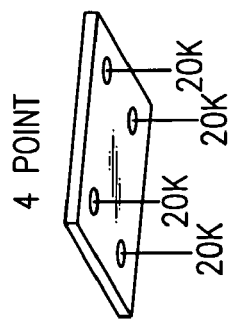
FIGS. 8A-8D are various line combinations for a four point sling system as illustrated by the exemplary aircraft in FIG. 1A.
Figure 8C:
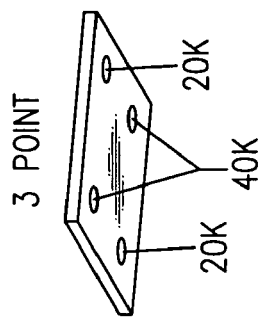
Figure 8B:
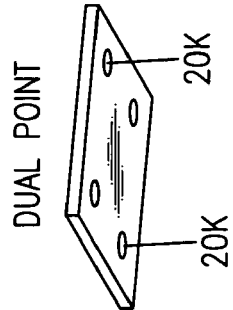
Figure 8A:
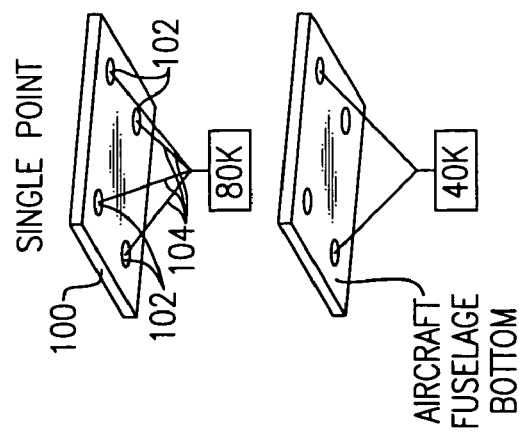

Referring to FIG. 2, load sensors 26a-26n are incorporated into the landing gear 28, aircraft cabin floor 30, external load hooks 32 as well as other locations so that load information is relayed to an aircraft Load Management System 34 where software calculates the aircraft's C.G. position for review upon a display 36 such as a multi-function display (MFD) to provide a representation of the fore/aft and lateral loads of the aircraft and the C.G. location. An input device 37 such as a keyboard, control grip, mouse, track ball, touch screen, or other such control provides for interaction with the Load Management System 34. It should be understood that the display 36 and input device 37 need not be located only in the aircraft concept and may be located for access by other aircrew members.

Referring to FIG. 3, an ACTIVE LOAD DISPLAY Page displayed by the aircraft Load Management System 34 includes the following symbology: a Longitudinal C.G. Scale 38; a Lateral C.G. Scale 40; a Plan View 42; and a Profile View 44.

The Plan View 42 provided a top down view of the aircraft to provide perspective to the Lateral C.G. Scale 40 and Longitudinal C.G. Scale 38. An Aircraft Weight Table 46; Landing Gear Weight Readouts 48; C.G. Limits Ring 50; Actual C.G. Indicator Ball 52; Auto Fuel Transfer Ring 54; Hook Status Indicators 56A, 56B, 56C (here for a three hook system); a Ramp Status Indicator 58; Orientation Symbols 60; External Fuel Tanks 62 (if so equipped), Fuselage 64, and Cabin Floor Plan 66 are also displayed on the ACTIVE LOAD DISPLAY Page.

Lateral C.G. Scale

The Lateral C.G. Scale 40 provides real-time lateral C.G. information. The Limit Indicators are color coded such that a red limit indicator at the end of the scale displays the C.G. limits of the aircraft. The C.G. Limits are based on the Gross Weight of the aircraft as well as other factors. As the Gross Weight of the aircraft increases, the indices begin to fill from the outer edges inward with a color (red) to show the decrease in acceptable C.G. range as the aircraft approaches Max Gross Weight.

Inboard of the limit indicator bands (yellow) which provide a C.G. cushion to be utilized as a cautionary range to alert the aircrew of approach to the C.G. limit. During Load Planning, the Caution indicators represent the change in C.G. limits anticipated with a planned (not actual) load(s). The white arrow from the Actual C.G. Indicator Ball 52 provides a visual indication of the actual lateral C.G. of the aircraft with respect to the lateral limits.

Longitudinal C.G. Scale

The Longitudinal C.G Scale 38 provides the flight crew with real-time longitudinal center of gravity information similar to the Lateral C.G Scale. A "Check Torque" symbol 68 will only appear over the Longitudinal C.G. Scale 38 when power being applied to the aircraft exceeds the torque limitation for the current conditions to indicate that more power is required for the current operation.

Load Hook Scale(S)

A Load Hook Scale 70 (also illustrated in FIGS. 3A, 3B, and 3C) for each hook 32 (FIG. 2) correspond to the number of external cargo hooks include fill bars which fill when loads are hooked and lifted to indicate the load weight and provide trending information with respect to hook capacity. In one non-limiting embodiment, if only the fore and aft hooks are utilized for separate loads, the fill bar will represent the maximum weight due to current C.G. restrictions but may not represent the max limit. A digital number representing the load weight/1000, for example, is adjacent each fill bar. If the maximum weight is exceeded, the bar becomes completely filled (FIG. 3B), the color will change to red, and the system 34 will provide a visual and the aural warning.

Typically, the center hook (FIG. 3B) has a hard structural limit while the Max Dual Hook Load (FIG. 3C) are restricted to limits in response to C.G. limitations which vary depending on current aircraft configuration.

The Aircraft Weight Table 46 displays numerically the following weights:

AC WT—The Basic Weight of the aircraft as determined from the maintenance weighing records. This is a fixed number by aircraft tail number. It is set in the system by Maintenance and is updated by maintenance every time that there is a required weighing of the aircraft.

INT WT—Internal Weight is defined as the sum of crew, passengers and internal cargo that has been loaded on the aircraft.

EXT WT—External Weight is defined as the sum of the weight on all active hooks.

FUEL—Fuel weight may be planned fuel weight entered by the flight crew which will have a "P" displayed next to the number. As soon as the Fuel System is operational, the "P" will be removed and the Actual Fuel Weight will be displayed.

GROSS—The Gross weight represents the sum of the AC WT, INT WT, EXT WT, and FUEL, listed in the table and represents the current take-off (T/O) weight of the aircraft and load.

If any of the weights are planned weights a "P" is placed next to that weight number and the gross number. When the aircraft systems are powered up, the ACTIVE LOAD DISPLAY Page will display the weight of the aircraft at each of the landing gear while the aircraft is stationary on the ground with electric power applied. These weights will update INT WT, and with Fuel Data, revise the Takeoff Weight from Planned to Actual. When the aircraft lifts off of the ground the weight information displayed at each gear will be removed from the Plan View by the action of a weight on wheels switch. When the landing gear is retracted, the wheel symbology will be removed from the Plan View. When the landing gear is lowered the landing gear symbology will reappear on the Plan View as each gear set is extended and locked. When the aircraft lands, the weight on wheels switches allow the Load Management System 34 to read the load sensors 26a in the landing gear 28 and update the weight information.

Actual C.G. Indicator ball

The Actual C.G. Indicator Ball 52 is a circular C.G. symbol with arrows pointing to the lateral and longitudinal C.G. scales 38, 40 provided in the Plan View. During operations, the Actual C.G. Indicator Ball 52 is continuously recalculated and updated and the results displayed on the Plan View 42 and the Profile View 44. This provides the aircrew with a continuous visual update of the aircraft's center of gravity relative to the C.G. limits of the aircraft.

C.G. Limit Ring

The C.G. Limit Ring 50 (normally green) is sized to represent the C.G. limits at the Planned Gross Weight Limit. Ring size varies with C.G. limits. Once all aircraft systems are powered up, the symbol is resized based on actual weight. When the actual C.G. Indicator Ball 52 approaches the C.G. Limit ring 50, the C.G. Limit Ring 50 will change color (from Green to Yellow). When the Actual C.G. Indicator Ball 52 intersects the C.G. Limit Ring 50, the symbol will change color (from Yellow to Red) indicating that the actual C.G of the aircraft is beyond the safe operating limits. A warning message is then displayed and an aural alert "C.G. Limits" may be announced.

Auto Fuel Transfer Ring

The Auto Fuel Transfer Ring 54 (normally blue) facilitates transfer of fuel to maintain C.G. within predetermined limits and reduce nose attitude excursions. When the Actual C.G. Indicator Ball 52 intersects the Auto Fuel Transfer Ring 54, fuel transfer will commence to move the aircraft C.G. toward a more central position. Symbology wise, the Actual C.G. Indicator Ball 52 will move towards the center of the Auto Fuel Transfer Ring 54. An advisory message, "FUEL XFR" will be displayed on the Caution and Advisory system.

Alternatively, or in addition thereto, the aircrew has the option to manually move the Auto Fuel Transfer Ring 54 on the ACTIVE LOAD DISPLAY Page. This will cause the Actual C.G. Indicator Ball 52 to intersect the Auto Fuel Transfer Ring 54 earlier than the actual fuel load otherwise would. Such manual positioning of the Auto Fuel Transfer Ring 54 with respect to the C.G. limit ring 50 facilitates fuel transfer in anticipation of picking up or dropping a load that is expected to affect aircraft C.G.

Cabin Floor Plan

The Cabin Floor Plan 66 (illustrated separately in FIG. 3D) provides a schematic of the internal cargo area to assist the aircrew with the placement of cargo. It is divided into sections, labeled A thru E and subdivided into left and right columns. Station and Butt Line dimensions are known for each of these sections.

The Hook Status Indicators 56A-56C (illustrated separately in FIG. 3E) is also displayed on the Cabin Floor Plan 66. It should be understood that although three Hook Status Symbols 56A-56C are disclosed in the illustrated embodiment, any number of hooks are usable with the present invention. In one non-limiting embodiment, each Hook Status Symbol 56A-56C is positioned on the Cabin Floor Plan 66 to directly correspond with the actual hook position on the aircraft. The External Hook System 32 (FIG. 2) is initially powered up and BIT performed when a Hook Select switch 71 is other than OFF. The Hook Status Indicators 56A-56C are color-coded squares located on the Cabin Floor Plan 66 in their proper position. When an External Hook 32 is off, the corresponding symbology is gray in color, meaning that power is not available to the hooks or the hooks are otherwise unavailable (not installed). When the Hook Select Switch 71 is set to ALL (as shown), the Hook Status Indicators 56A-56C will switch from gray to white once the power up and BIT test on the selected external hook(s) 32 is/are complete. If one of the redundant load sensors fails BIT, that Hook Status Indicator 56A-56C will switch from gray to yellow indicating a degraded hook 32. If a hook fails the BIT, the Indicator will switch from gray to red, if an external hook 32 does not lock after hookup, the Indicator will switch from white to red. When each external hook 32 is loaded with weight on the external hook 32, that indicator will switch from white to green. If the sensed load is above a predetermined vale for the Fore Hook, the Aft Hook, the Center Hook, or during Dual Hook operations, the indicator(s) will change to RED, and a warning is displayed. When a Hook is normally released the status indicator will switch from Green to White. If the Hook does not open, the Hook Status Indicator will switch from Green to Red and an Advisory is sent to the WCA System in combination with an Audio Alert.

Profile View

The Profile View 44 displays the external loads planned for the mission. Under each load will be the planned weight for that load plus the letter "P" to indicate that it is planned. When the actual load is attached to the hook and it is lifted off of the ground, the Load Sensor 26b value (FIG. 2) for the weight will replace the planned value under the load symbol and the "P" will be removed. If an external load is not planned for a specific hook, the load symbol for that hook will not be present. However if the load sensor 26b for that external hook 32 (FIG. 2) senses an actual load attached, the symbol for a load for that hook will appear along with the sensed weight.

In one non-limiting embodiment, any "PLAN" or "WHAT IF" scenario where multiple loads or a Dual Point Load is planned where loss of one of the multiple loads or one end of a Dual Point Load would result in an out-of-C.G. condition, the Profile View 44 will display "Auto-Jettison" (FIGS. 3F, 3G) either on the fuselage of the Profile View, or on the Dual Point Load Symbol. If those planned loads are then actually carried, the "Auto-Jettison" symbology will be updated to display "ARMED" as the auto jettison system becomes armed.

Any projected flight control excursion or attitude rate of change in excess of normal operations will result in an Auto-Jettison event to maintain the aircraft within the C.G. Limits. Selecting Dual Hook Mode also configures the aircrew operated release switches to simultaneously release both the FORE and AFT Hooks when actuated.

For Multiple Independent Loads of two or more, the system will analyze first the Planned Loads and then the Actual Loads and recommend, if necessary, an Order of Release for the loads. This order will be a number that appears in the center of each load symbol and is established to ensure that release of the loads will have minimal impact on aircraft C.G. In other words, even normal aircrew initiated release will release the loads in an order which prevents C.G travel beyond acceptable limits.

Cargo Load Planning Page

From the ACTIVE LOAD DISPLAY Page (FIG. 3), when LOAD PLAN 72 is selected, a CARGO LOAD PLANNING Page will be displayed on the selected MFD (FIG. 4). The MFD background changes color (to dark blue) to further differentiate it from the ACTIVE LOAD DISPLAY Page (FIG. 3).

Referring to FIG. 4, the CARGO LOAD PLANNING Page displays the following symbology: the Longitudinal C.G. Scale 40, the Lateral C.G. Scale 38, the Plan View 42; and the Profile View 44. The Plan View is de-cluttered to assist the aircrew with cargo load planning tasks. In one non-limiting embodiment, removed from the Plan View are the landing gear and their corresponding weights, the C.G. Limits Ring, the Auto Fuel Transfer Ring, the Hook Status Indicators, and the External Fuel Tank symbology.

Plan

Selecting PLAN 74 permits the aircrew to enter data and save that information in the Load Management System 34. Plan Weight and Balance Data entered under PLAN will only be changed by edits to the plan or actual data (if available), as measured by onboard sensors.

What If

Selecting WHAT IF 76 permits the aircrew to add or delete Weight & Balance (W&B) data to simulate the effect on the overall center of gravity (C.G.) of the aircraft. Edits in this mode do not affect actual aircraft data.

"PAX" is an abbreviation for "Passenger(s)." Selecting PAX 78 will change the PAX symbology to reverse video to provide visual feedback of the selection. This will deselect any other selections available under the INTERNAL column. The main display will declutter the Cabin Floor Plan 66 symbology. Symbols representing cabin seating 80 will also appear on the Cabin Floor Plan 66. This facilitates selection of either a floor area square (right/left A-E block) to add 3 passengers at a time, or selection of individual seats to add one passenger at a time. This action will fill selected seats with a color such as magenta to indicate, for example, a 260 pound "Assault Loaded Marine." A listing of additional weights (colors) for other passenger types (such as Blue for a Flight Crew member or standard 240 pound Marine) is also available. Color coding for other passenger types may additionally be provided.

Weight change is accomplished by selecting a seat and inputting the weight at the displayed prompt on the input device 37. That weight and associated color will remain until a new weight is input. For each filled seat the Load Management System 34 adds the appropriate weight and the station so that the C.G. can be calculated. Re-selecting a filled seat will remove the fill, weight, and station from C.G. calculations. Re-selecting a floor area square will remove the fill, and weight from all filled seats within that square. The example page of FIG. 4 shows the loading of 4 Flight Crew Members and 21 "Assault Loaded Marines".

Cargo

Selecting CARGO 80 will change the symbol to inverse video, return the PAX label to normal video, and change the Plan View 66 to remove the unoccupied seat symbols to de-clutter for internal cargo planning (FIG. 5). All seats planned to be occupied by passengers/crew may remain but a Cargo Selection Table 82 will be added to the bottom of the CARGO LOAD PLANNING Page.

Cargo Selection Table

Various cargo symbols 84A-84G utilized while planning cargo loading are displayed in the Cargo Selection Table 82. When a Cargo symbol 84A-84G is selected, a Cargo Tag 86 will appear adjacent to the selected cargo symbol. Once selected, the Cargo Symbol 84A-84G and Cargo Tag 86 can be dragged, using the input device 37 (FIG. 2), to place the symbol on the Plan View 66.

The Cargo Tag 86 will display on the first line a sequential number preceded by the "#" symbol that will uniquely identify this element of cargo from all the other cargo entities in the current Internal Cargo Load Plan. The second line is for the weight of the cargo item that the symbol represents in thousands of pounds, represented by "k" after the weight. In the cases of the full size 463L Pallet cargo symbol, a default load of 10,000# is assumed to be loaded. The aircrew may edit that value down if necessary. Similarly the ½ 463L Pallet cargo symbol is set at 5000# and the 40"×48" wooden pallet cargo symbol is set to have 2500 # loaded on it, the Horizontal Rectangle cargo symbol is set to 1500#, and the vertical rectangle cargo symbol is set to 1000#. In all cases the aircrew can edit the weight down. It should be understood that various cargo symbols may alternatively or additionally be provided and various other pages such as a cargo list page may also be provided.

Upon appearance of the Cargo Tag 86, a display in an input device 37 will show, in this case "#3" "Weight=800 lbs, and Station=462.0". The aircrew can either enter all the pertinent data via the input device 37 or type in the weight and then move the selected cargo symbol with its attached Cargo Tag 86 inside the Plan View 66 and position the cargo symbol where the cargo has been placed. If all data is entered via the input device 37 then the Cargo symbol will immediately move to its correct position within the Plan View 66. Otherwise, the aircrew may reposition the Cargo Symbol 84A-84G and its Cargo Tag 86 with cursor controller 39 (drag and drop). As the Cargo Symbol 84A-84G enters the Plan View 66, the STA value will scroll within the Cargo Tag 86. The third line is a "STA" label and the fourth line is the actual station value in inches. The STA value, for example only, may be defined from STA 162 at the front of the Cabin Floor Plan 66 to STA 522 at the floor/ramp interface, to STA 609 at the aft edge of the ramp. When the Cargo Symbol is dropped, the Cargo Tag will be removed from the display, the weight and station information will be calculated Load Management System 34, and the C.G. Indicators will adjust accordingly. A novel feature of this activity is the placement of the "Vehicle" Cargo Symbol 84G.

"Vehicle" Cargo Symbol

The Vehicle Cargo Symbol 84G can have two or more axles and the weight and STA location of each of these axles is enterable into the Load Management System 34. Default axle weight is 5,000# and is editable. This can either be entered via the input device 37, or by selecting the vehicle Cargo Symbol 84G and moving the symbol and its cargo tag to the correct position for the forward axle (axle closest to the cockpit). After entering the axle weight, and then selecting again, the cursor can now be moved to select the second axle, enter the axle weight via the input device 37, and drag the second axle into position, thus extending or shrinking the vehicle Cargo Symbol 84G so that the second axle is located at the correct station. This process is continued to attaché additional axles until the aircrew enters a "0" for weight to confirm that there are no more axles.

External Cargo Load Planning Page:

The right column 88 allows the flight crew member to PLAN or WHAT IF EXTERNAL loads (FIG. 6). Referring to FIG. 6, PLAN permits the aircrew to enter data and save that information to the System. Weight and balance (W&B) Data entered under PLAN will only be changed by edits to the plan or actual data (if available), as measured by hook/load sensors. WHAT IF allows the Flight crew member to arbitrarily add or delete W&B data, or completely remove the load from a hook position in order to see the effect on the overall C.G. of the aircraft. Any edits in WHAT IF mode results in movement of the C.G. INDICATOR BALL to view the result of a WHAT IF, but does not affect actual aircraft data as discussed above with regard to Internal Cargo Load Planning Fuel Load Planning Page On the ACTIVE LOAD DISPLAY Page (FIG. 3) the aircrew can also select FUEL PLAN 90 and the display will switch to the FUEL LOAD PLANNING DISPLAY Page as shown in FIG. 7. This page displays a number of options that will: reset the system 34 back to the current conditions and display actual fuel quantity and distribution; allow the aircrew to investigate various fuel loadings and the subsequent changes in C.G.; and allow the system 34 to automatically set the maximum allowable fuel to meet mission requirements and distribute it to benefit current C.G. conditions.

Manual setting of fuel levels are accomplished by use of the input device 37. The cursor is placed over a tank and the tank (or pair of tanks) is selected. The border of the tank (or pair of tanks) becomes highlighted and a magenta refueling bug will appear on a scale side of the tank. Moving the cursor up/down will then increase/decrease the level of fuel in the tanks and move the refueling bug(s) along the scale side of the tank to set the level desired in each tank during refuel/defuel. When the fuel level is at the desired level, re-selecting the tank will return the tank outline to normal but leave the refueling bug and the fuel level at the value set.

Fuel Plan

The Fuel Plan 92 displays the choices as actual-man-auto such that each time the associated switch is selected, the highlight will cycle through each of the selections. The current selection is shown in inverse video:

ACTUAL—displays the current fuel level in all tanks (default). Selection of ACTUAL will remove the Refueling Bugs and allow maximum fuel in all tanks MANUAL—allows the aircrew to manually set the refueling indices (Bugs) to the desired fuel levels. When selected the Magenta refueling bug labeled "M" for manual setting will appear next to the current fuel level of the selected tank(s) and the Total Quantity value for that tank(s) will change to the magenta color.

AUTO—allows the computer to review available atmospheric, flight plan and Load Plan data; to set recommended fuel for takeoff based on not exceeding maximum gross weight for the current conditions. Additionally, the fuel will be distributed through all tanks to improve the current center of gravity conditions. When selected the Green refueling bugs labeled "A" for AUTO setting will appear next to the current fuel level of all tank(s) at the ideal levels to accomplish mission requirements while maintaining the best weight and balance conditions. The quantity readout in each tank will change to Green and represent the computer recommended quantity to refuel/defuel to maximize the mission.

Referring to FIGS. 8A-8D, various line combinations for a four point sling system 100 are illustrated. In each case, the load or combination of loads remain centered under the aircraft. The four-point sling system 100 includes four hoists 102 which individually deploy a cable 104 to the external load or loads L for attachment thereof. The cables 104 are connected to the external load L in any conventional manner. The four-point sling system 100 retracts the external load L to be carried close to an underside of the airframe 14 (FIG. 9A) to reduce the swing length to maintain the external load L between the aircraft landing gear. Alternatively or in addition thereto, the external load may be at least partially retracted into the aircraft.

The load information generated by the aircraft Load Management System 34 is communicated to a fly by wire (FBW) Flight Control System 105 (FIG. 2) to alter flight control laws and automatically compensate for C.G. excursions especially when the load L may not be close to the aircraft underside (FIG. 9B). For example, if an aircraft has an aft C.G. (along the longitudinal aircraft axis), the flight control system 10 is programmed to automatically trim the cyclic controls for that condition. That is, in this tail-heavy condition, rapid forward control by the pilot may cause excessive forward flapping and droop stop pounding which can be minimized by flight control law modification. However, the FBW system with real time C.G. location information from the Load Management System will automatically trim the aircraft controls and modify the FBW flight control laws so that the rate of cyclic input by the pilot is reduced, thus eliminating excessive flapping. The FBW system compensates in this manner for any combination of lateral and longitudinal C.G. position in response to the system 34.

Figure 10A:
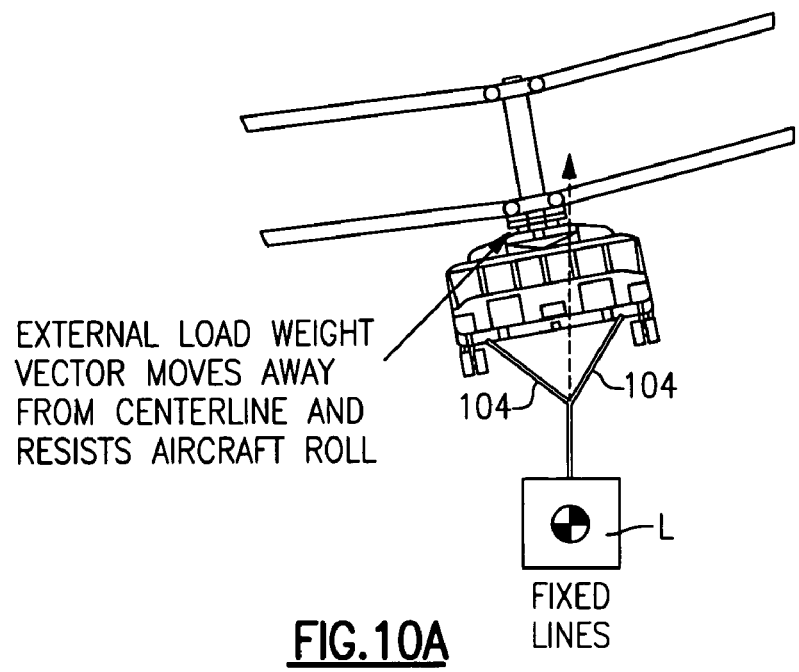
FIG. 10A illustrates a front view of an aircraft with a slung load that has traveled off the aircraft centerline in response to aircraft maneuvering.

Referring to FIG. 10A, a load vector from a slung load L will travel off the aircraft centerline when the aircraft pitches or rolls as there may be adverse load vector travel when two or more lines 104 are connected together. A wide set four point system (FIGS. 8A-8D) results in the load vector traveling considerably farther off the aircraft centerline when connected together. The same is true for a two or thee point system connected together.

Figure 10B:
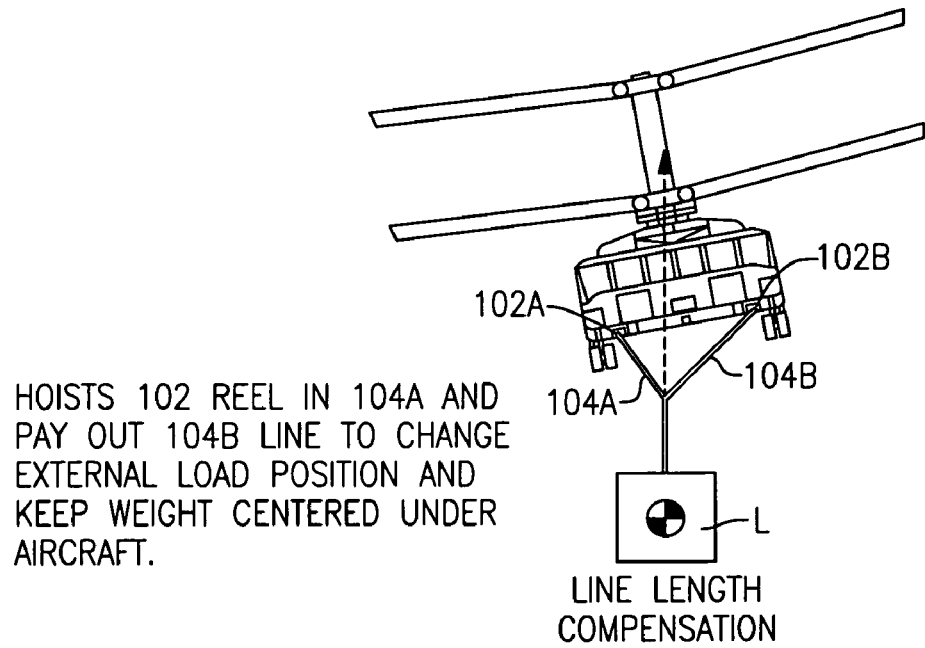
FIG. 10B is a front view of the aircraft illustrated in FIG. 10A illustrating selective slung load line control to maintain the slung load under the aircraft centerline.

Referring to FIG. 10B, load vector travel is reduced by selectively reeling in and lengthening the lines as the aircraft pitches and rolls. This compensation is accomplished automatically by coupling a winch control system 106 into the flight control system 108 (FIG. 2) by communicating load information to the winch control system 106 and to the flight control system. In one non-limiting embodiment, the load system utilizes line tension information to identify movement of the slung load in conjunction with information from the flight control system. It should be understood that various indices may be utilized to detect movement of the slung load and provide compensation therefore.

The winch control system 106 reels in and out individual lines 104A, 104B as required to maintain the load vector through the center of the aircraft. As the load control system compensates for load movement and trim changes as the external load position shifts, the Load Management System 34 also receives real time flight data and control position inputs from the flight control system. This data enables the Load Management System 34 to anticipate aircraft attitudes and accelerations to provide proactive control. This data is used to reel lines in and out, minimize load swing, and thus improve aircraft control. The heretofore requirement of a fifth center hook may also eliminated as all four lines can be connected together (FIG. 8A) to maximize load capacity yet minimize movement of the slung load.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A system to manage aircraft loads, comprising:

a sensor system that receives weight information;

an aircraft load management system in communication with said sensor system;

a display in communication with said aircraft load management system, said display operable to display an aircraft C.G. in real time, said aircraft C.G. represented by an actual C.G. indicator ball symbology relative to a C.G. limit ring symbology; said actual C.G. indicator ball symbology and said C.G. limit ring symbology overlaid on an aircraft plan view which comprises an aircraft internal cargo area schematic; and a cargo symbol, said cargo symbol placed relative to said aircraft internal cargo area schematic by an input device in communication with said display, said aircraft load management system operable to adjust said aircraft C.G. in real time in response to a relative position of said cargo symbol and upon said aircraft internal cargo area schematic.

2. The system as recited in claim 1 wherein said actual C.G. indicator ball symbology and said C.G. limit ring symbology are overlaid on an aircraft profile view.

3. The system as recited in claim 2 wherein said aircraft profile view comprises a schematic which displays at least one external load.

4. The system as recited in claim 3 wherein said aircraft load management system is operable to identify an order of release of said each external load of said at least one external load.

5. The system as recited in claim 4 wherein said order of release is defined to ensure that release of said each external load of said at least one external load will have minimal impact on said aircraft C.G.

6. The system as recited in claim 3 wherein a "P" is located adjacent each load value of said at least one external load to identify a planned weight for said each load of said at least one external load.

7. The system as recited in claim 6 wherein said planned weight for said each external load of said at least one external load is replaced by an actual load value and removal of said "P" in response to aircraft liftoff and weight measurement of said each external load of said at least one external load by said sensor system.

8. The system as recited in claim 1, wherein said aircraft load management system is in communication with a flight control system.

9. The system as recited in claim 1 wherein said aircraft internal cargo area schematic is divided into sections and subdivided into left and right columns.

10. The system as recited in claim 1 wherein said aircraft internal cargo area schematic is defined in part by station and butt line dimensions.

11. The system as recited in claim 1 wherein said cargo symbol includes a vehicle symbol defined in part by an axle position relative to said aircraft internal cargo area schematic.

12. The system as recited in claim 1 wherein said cargo symbol includes a Pallet cargo symbol.

13. The system as recited in claim 1 wherein said aircraft C.G. includes at least one of an internal load within said aircraft internal cargo area and an external load.

14. The system as recited in claim 1 wherein said aircraft C.G. includes both an internal load within said aircraft internal cargo area and an external load.

15. A system to manage aircraft loads, comprising:
an aircraft load management system that determines aircraft C.G. data of an aircraft with an;
a flight control system in communication with said aircraft load management system, said flight control system programmed to adjust an aircraft trim state in real time through alteration of at least one flight control law of said flight control system to automatically compensate for aircraft C.G. excursions in response to said aircraft C.G. data, said aircraft C.G. data includes one or both of an internal cargo load within an aircraft internal cargo area and an external cargo load; and
a sling system in communication with said aircraft load management system, said aircraft load management system programmed to adjust a slung load in real time to maintain a load vector of the slung load generally along an aircraft centerline.

16. The system as recited in claim 15, wherein said aircraft load management system is in communication with a display programmed to display an aircraft C.G. relative an aircraft symbology to display the aircraft C.G. data in real time.

17. The system as recited in claim 15, wherein said sling system comprises a multiple of independently operable hoists, said aircraft load management system programmed to adjust a line length between each hoist and the slung load.

18. The system as recited in claim 15, wherein said load management system anticipates aircraft's attitudes and accelerations to provide proactive control.

19. The system as recited in claim 18, wherein said aircraft load management system receives real time flight data and position inputs from said flight control system.

20. A system to manage aircraft loads, comprising:
a sensor system that receives weight information;
an aircraft load management system in communication with said sensor system;
a display in communication with said aircraft load management system, said display operable to display an aircraft C.G. in real time, said aircraft C.G. represented by an actual C.G. indicator ball symbology relative to a C.G. limit ring symbology, said actual C.G. indicator ball symbology and said C.G. limit ring symbology overlaid on an aircraft plan view which comprises an aircraft internal cargo area schematic; and
a multiple of PAX symbols which represent cabin seating within said aircraft internal cargo area schematic, said multiple of PAX symbols individually selectable to represent a predetermined passenger type, said aircraft load management system operable to adjust said aircraft C.G. in real time in response to said selection.

21. The system as recited in claim 20 wherein said predetermined passenger type includes an assault loaded marine passenger type.

22. The system as recited in claim 20 wherein said predetermined passenger type is color coded.

* * * * *